(12) United States Patent
Martín Martín et al.

(10) Patent No.: US 8,329,077 B2
(45) Date of Patent: Dec. 11, 2012

(54) METHOD OF MANUFACTURING AIRCRAFT FRAMES IN A COMPOSITE MATERIAL

(75) Inventors: Jesús Manuel Martín Martín, Madrid (ES); Ignacio José Márquez López, Madrid (ES)

(73) Assignee: Airbus Operations S.L., Madrid (ES)

( * ) Notice: Subject to any disclaimer, the term of this patent is extended or adjusted under 35 U.S.C. 154(b) by 24 days.

(21) Appl. No.: 12/941,774

(22) Filed: Nov. 8, 2010

(65) Prior Publication Data
US 2011/0049744 A1   Mar. 3, 2011

Related U.S. Application Data

(62) Division of application No. 11/799,324, filed on May 1, 2007, now abandoned.

(30) Foreign Application Priority Data

Feb. 28, 2007   (WO) ................. PCT/ES2007/070042

(51) Int. Cl.
*B29C 70/48* (2006.01)

(52) U.S. Cl. ...................... 264/101; 264/258; 425/129.1

(58) Field of Classification Search ................... 264/101, 264/257, 258; 425/129.1
See application file for complete search history.

(56) References Cited

U.S. PATENT DOCUMENTS

| | | | | |
|---|---|---|---|---|
| 6,958,105 | B2 * | 10/2005 | Herrmann et al. | 264/571 |
| 7,544,261 | B1 * | 6/2009 | Nogueroles Vines et al. | 264/35 |
| 2004/0130072 | A1 * | 7/2004 | Sekido et al. | 264/257 |
| 2006/0249626 | A1 * | 11/2006 | Simpson et al. | 244/123.1 |

* cited by examiner

*Primary Examiner* — Jill Heitbrink
(74) *Attorney, Agent, or Firm* — Ladas & Parry LLP

(57) ABSTRACT

The present invention relates to a jig for the manufacture, by means of injection and curing processes, of preforms of composite material frames for aircraft fuselages by using the RTM (resin transfer molding) technology. Two preforms are thus manufactured, one with a C shaped section and another with a L shaped section, together with the preforms of the stabilization ribs for stabilizing the web of the frames and the preform of the roving or staple fiber to cover the gap between the C shaped preform and the L shaped preform. Theses preforms are previously manufactured by any known process for manufacturing preforms. According to a second aspect, the present invention relates to a method of manufacturing composite material load frames for aircraft.

20 Claims, 6 Drawing Sheets

METHOD OF MANUFACTURING AIRCRAFT FRAMES IN A COMPOSITE MATERIAL

CROSS REFERENCE APPLICATIONS

This application is a divisional of U.S. patent application Ser. No. 11/799,324 filed May 1, 2007 now abandoned which claimed priority to Spanish PCT Application No. ES2007/070042 filed Feb. 28, 2007, the contents of which are incorporated herein by reference.

FIELD OF THE INVENTION

The present invention relates to a jig for the manufacture of composite material items for aircraft as well as a method of manufacturing such frames in a composite material.

BACKGROUND OF THE INVENTION

In addition to conferring shape and rigidity to the aircraft fuselage, load frames are structural elements in charge of withstanding and transferring the loads from other structural elements of the aircraft, such as the wings or stabilizers.

In the state of the art, the manufacture of the frames is carried out by using machined metal structures or shaped sheet metal structures in which that part that withstands most of the load is reinforced with machined parts. In the case of shaped sheet metal. The section that is normally used is obtained in two pieces; on one hand the Z is manufactured, and on the other hand, the brackets which are riveted to the former section are manufactured.

This process has the drawback that long assembly times are necessary and that the final weight is much greater than what would be desired.

SUMMARY OF THE INVENTION

In a first aspect, the present invention relates to a jig for the manufacture of aircraft load frames such that the section of the structure of the obtained frames is done in an integrated manner such that the resulting weight is optimized. At the same time, the manufacturing method proposed by the present invention is carried out using a repetitive process with short curing cycles, such that the times necessary for assembly are decreased.

Thus, the present invention develops a jig for the manufacture, by means of injection and curing processes, of composite material frame preforms for aircraft fuselages by using RTM (resin transfer molding) technology. Therefore, two preforms are manufactured, one with a C-shaped section and another one with an L-shaped section, together with the preforms of the stabilization ribs of the web of the frames and the preform of the roving or staple fiber to cover the gap between the C shaped preform and the L shaped preform. These preforms are previously manufactured by any known preform manufacturing process.

According to a second aspect, the present invention develops a method of manufacturing an aircraft load frame in a composite material.

Thus, aircraft load frames made of a composite material are obtained by means of the jig and the method of manufacture of the present invention with the following advantages:

Frames with complex and integrated geometries are manufactured, meeting the objective sought in any structure.

The problem of the surface finish on only one face is solved by adding a high dimensional precision without the necking of radii, since it is a closed framework.

Control of thicknesses is improved (reaching tolerances $\leqq 0.2$ mm), whatever these thicknesses may be, therefore achieving a good fit between the outer flange of the frames with the skin and the stringers making it rigid.

The process is repetitive with short curing cycle times, which reduces the duration of the manufacturing process.

Other features and advantages of the present invention will be understood from the following detailed description of the illustrative embodiments of its object, together with the attached drawings.

DETAILED DESCRIPTION OF THE INVENTION

In a first aspect, the present invention relates to a jig for injecting and curing the preforms of an aeronautic fuselage frame 2 made of a composite material.

Figure 1:
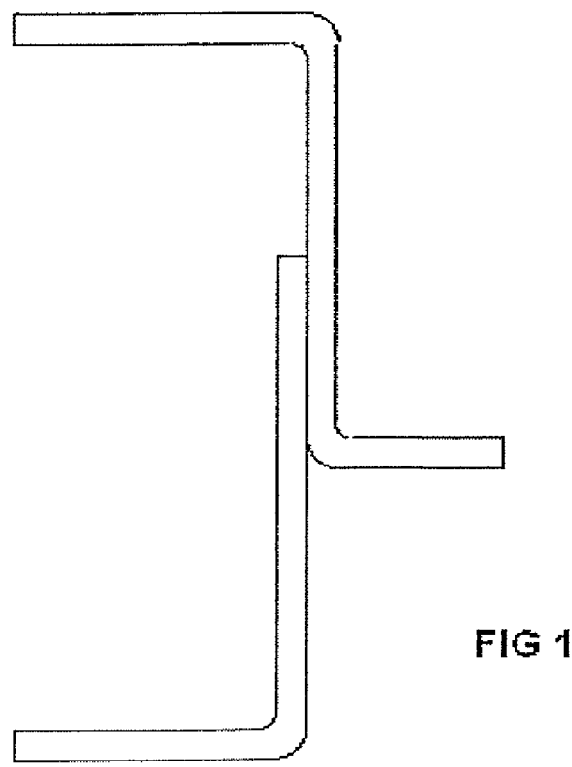
FIG. 1 shows the section of a known metallic aircraft load frame.
Figure 2:
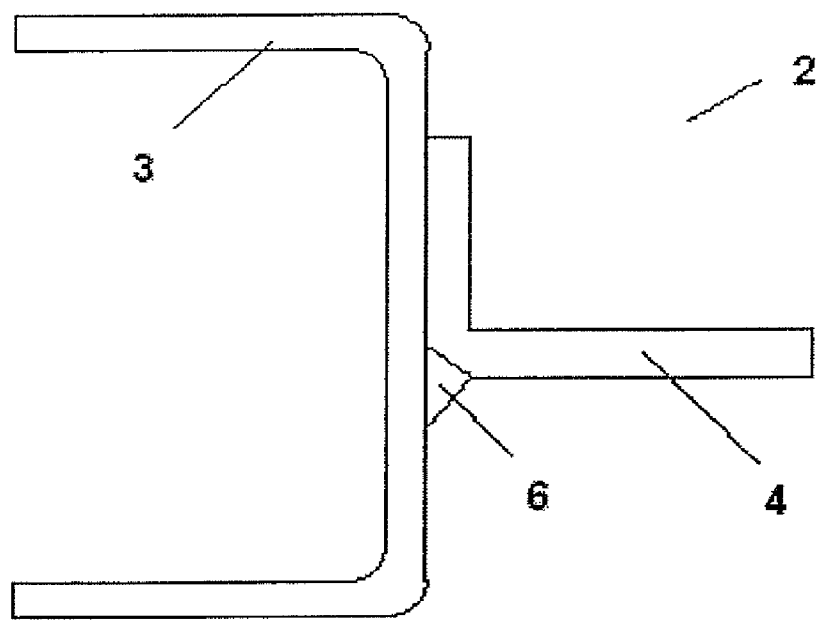
FIG. 2 shows the section of an aircraft load frame made of a composite material according to the present invention.
Figure 3:
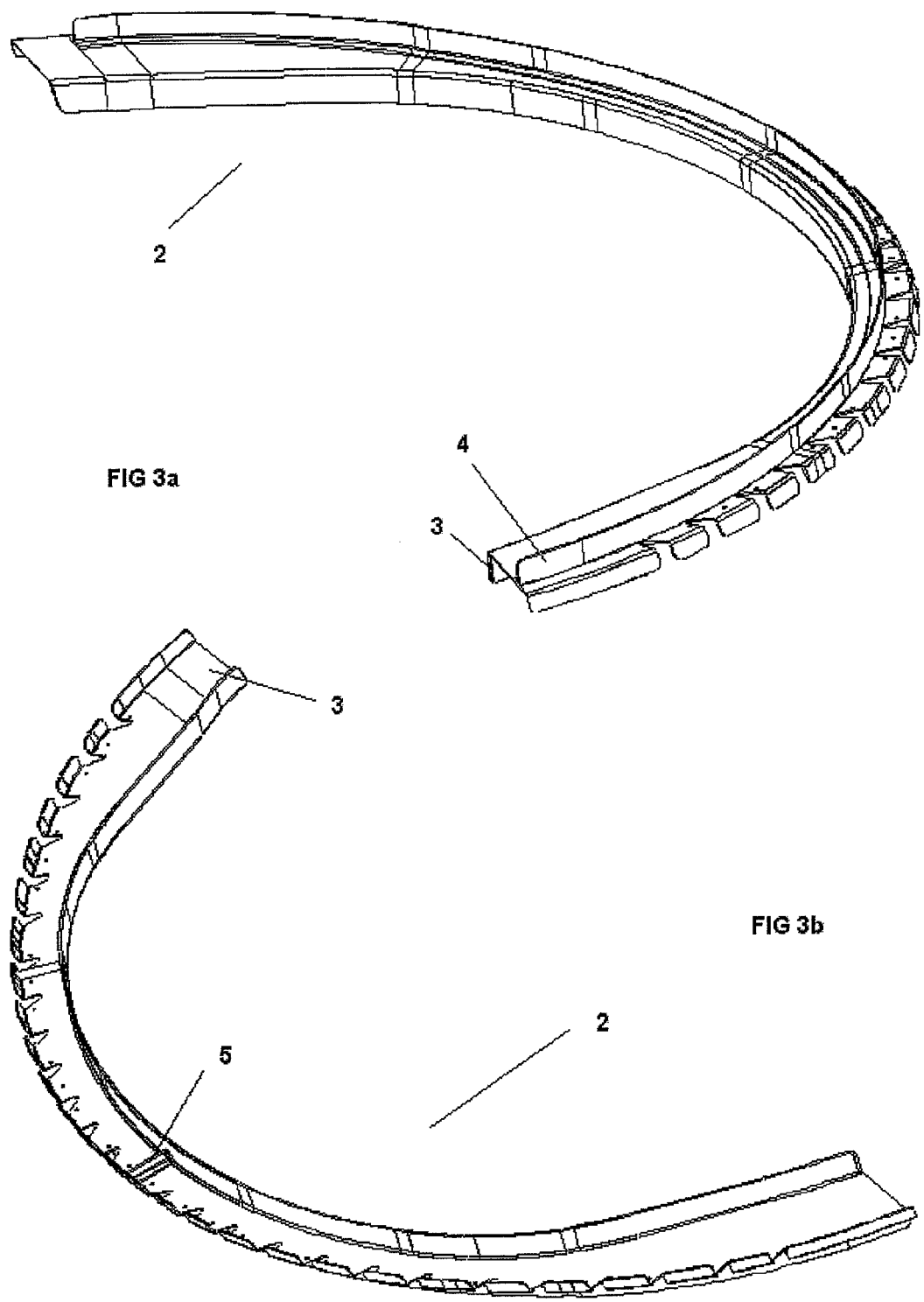
FIGS. 3a and 3b show perspective views of the aircraft load frame made of a composite material that is finished, impregnated and cured with the jig and the method of the present invention.
Figure 4:
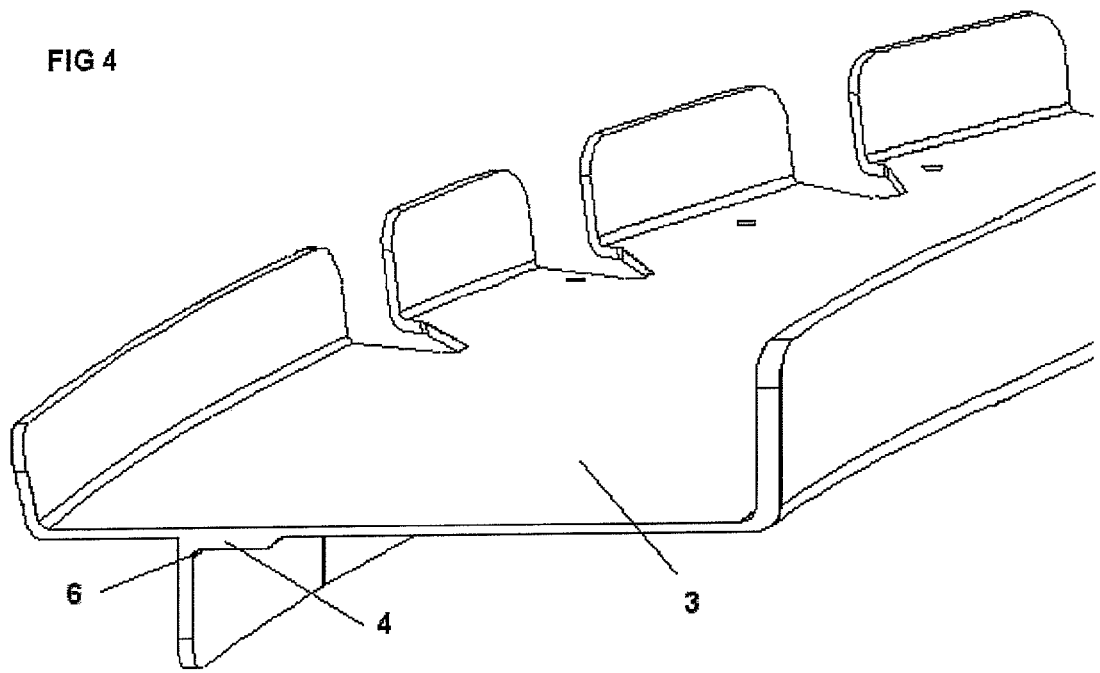
FIG. 4 and FIG. 5 show different views of a C-shaped preform of the aircraft load frame made of a composite material according to the invention in combination with an L-shaped preform of the aircraft load frame made of a composite material according to the invention.
Figure 5:
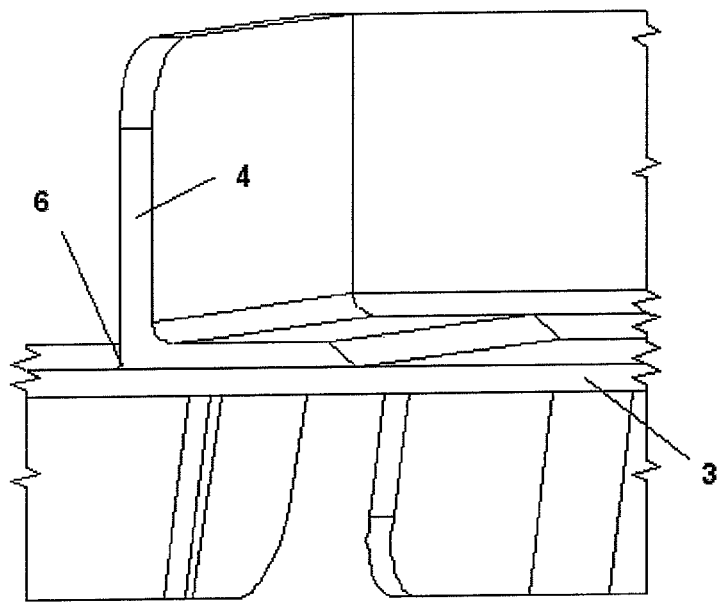
Figure 6:
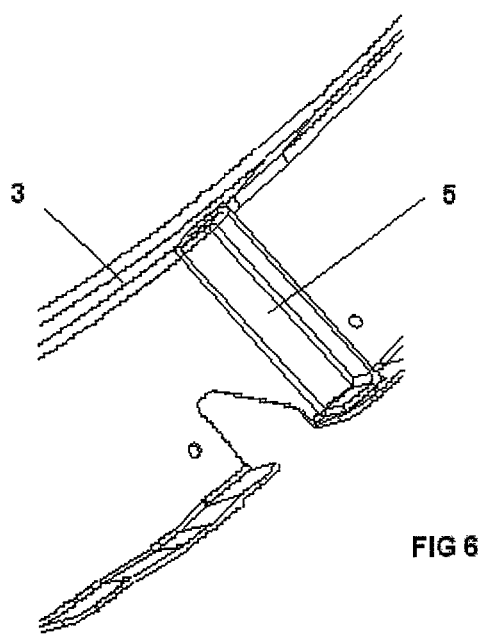
FIG. 6 shows one preform of the stabilization rib of the web of the aircraft load frame made of a composite material according to the invention.
Figure 7:
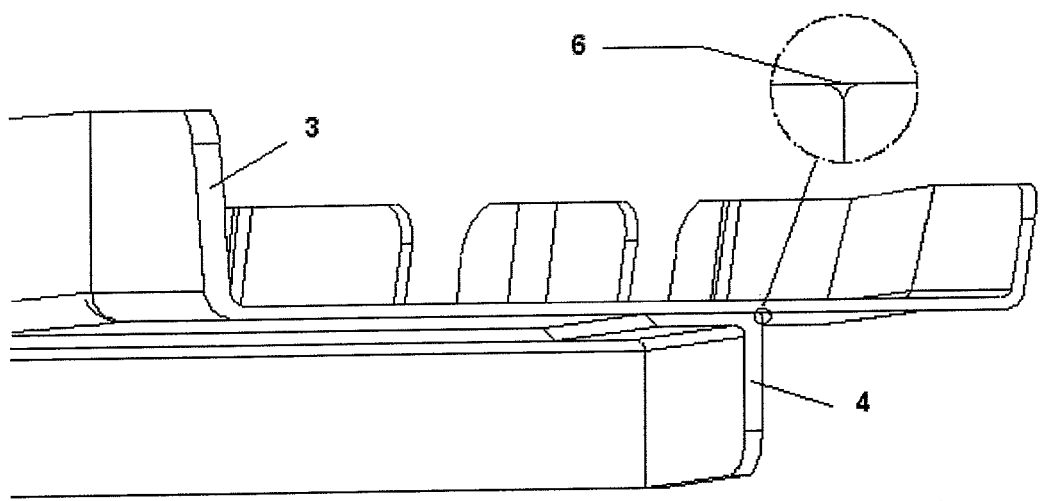
FIG. 7 shows a preform of the roving or staple fiber of the aircraft load frame made of a composite material according to the invention.
Figure 8:
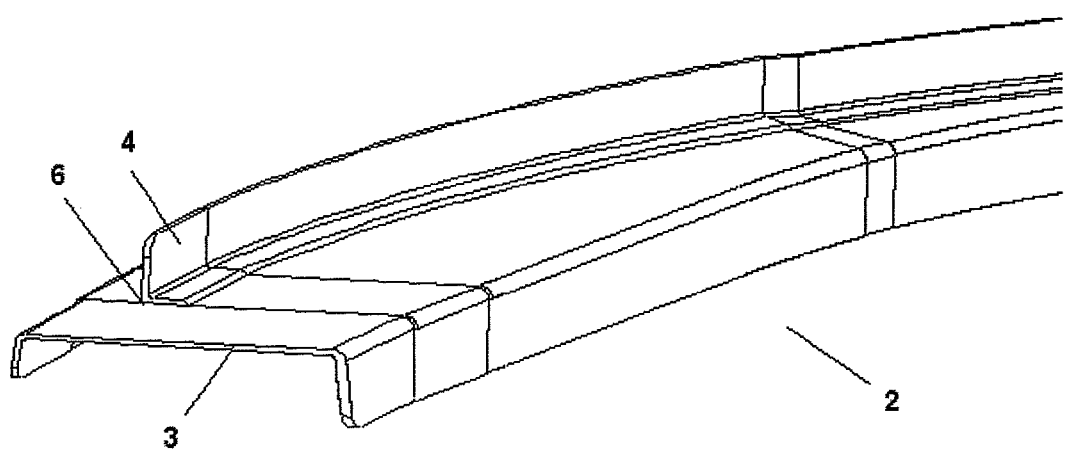
FIG. 8 shows the integration of the preforms shaping the aircraft load frame made of a composite material according to the invention.
Figure 9:
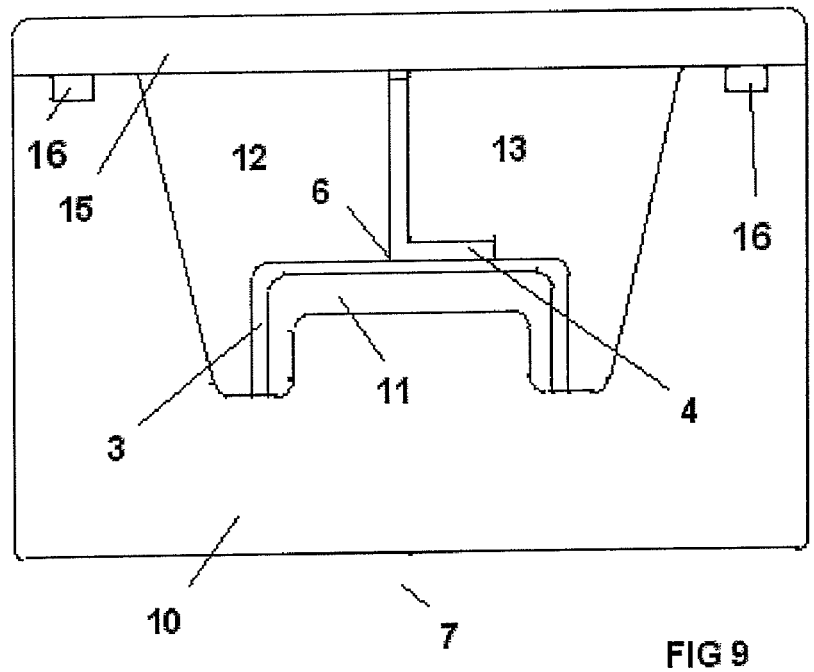
FIG. 9 shows a sectional view of the jig for the manufacture of composite material frames for aircraft according to the invention.
Figure 10:
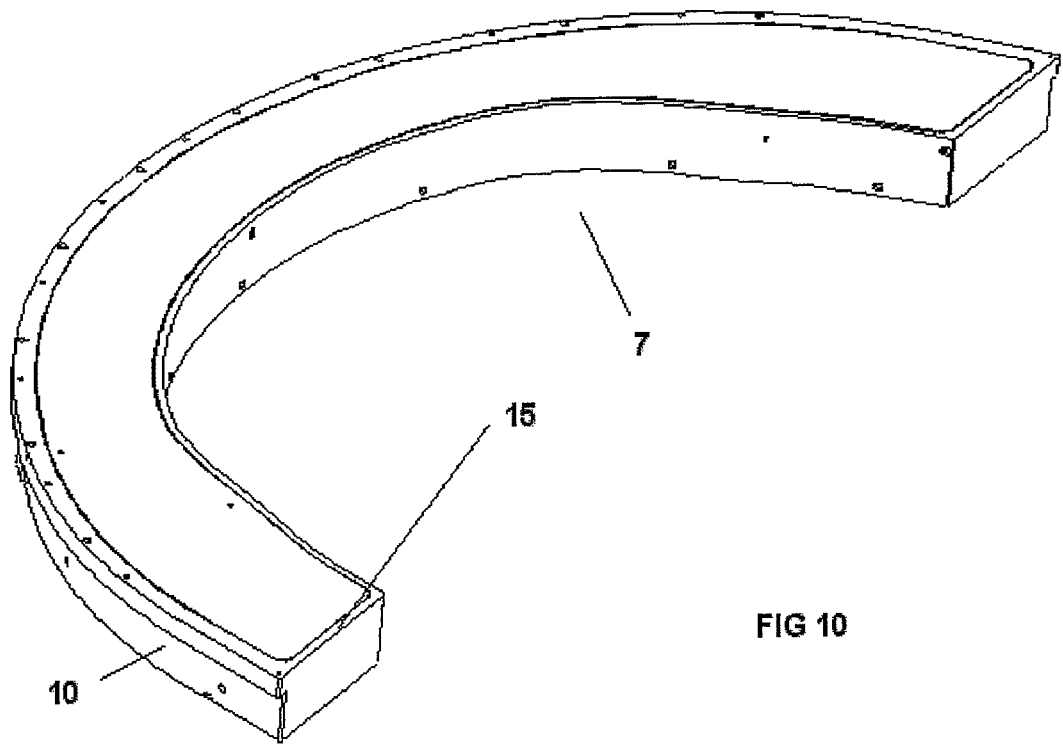
FIG. 10 shows a perspective view of the jig for the manufacture of composite material frames for aircraft according to the invention.
Figure 11:
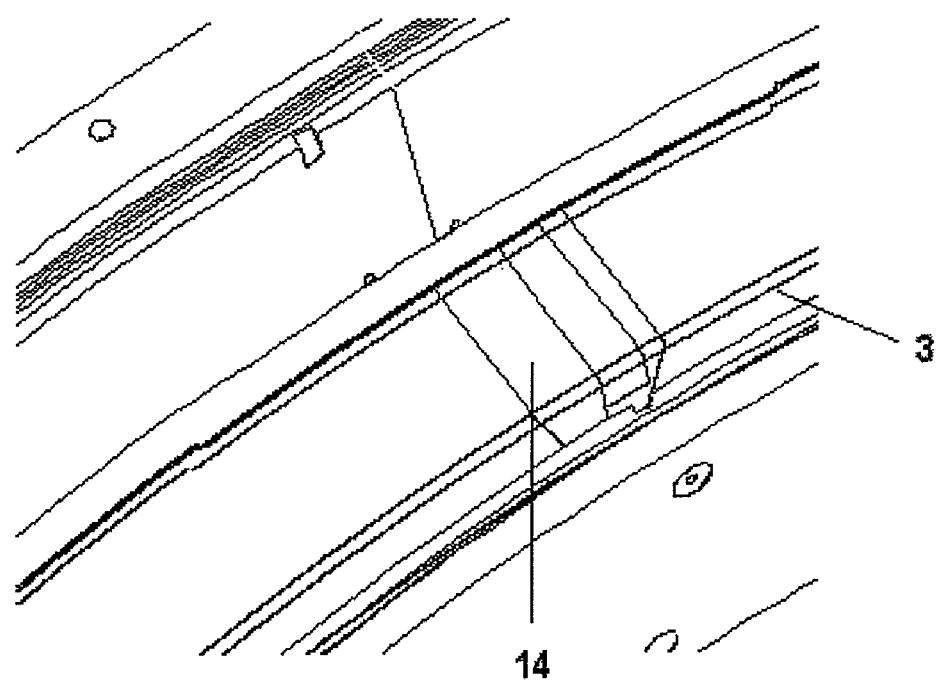
FIG. 11 shows a detail of the stabilization ribs of the web of the composite material frames for aircraft according to the invention.
Figure 12:
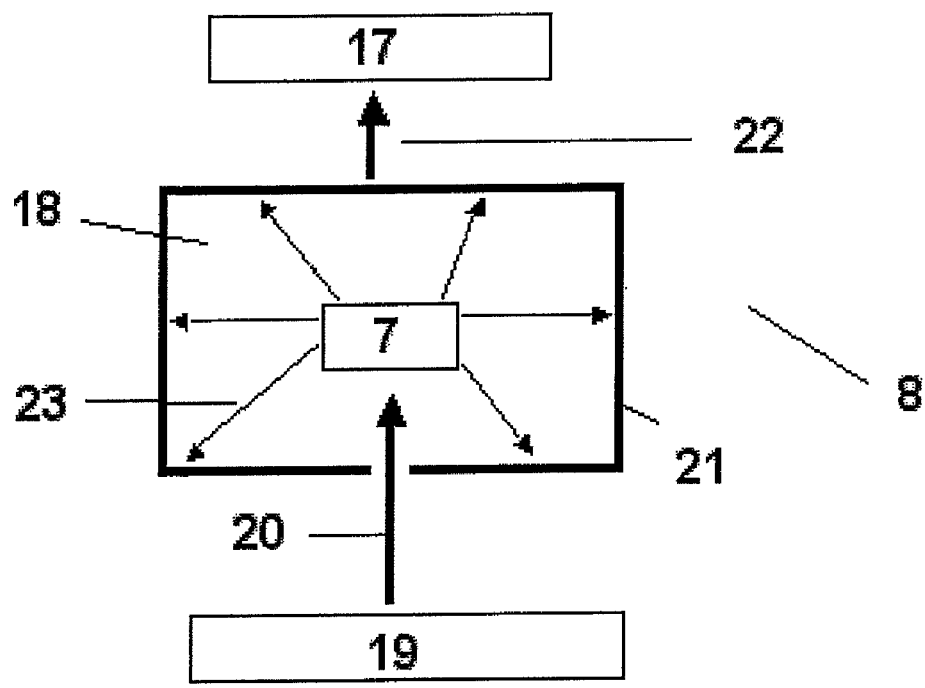
FIG. 12 shows a general view of the vacuum system of the jig for the manufacture of composite material frames for aircraft according to the invention.

The section to be manufactured is formed by a C-shaped preform (FIG. 4) and by an L-shaped angular preform 4 (FIG. 5), in addition to different stabilization ribs 5 of the web (FIG. 6) and a preform 6 of the roving or staple fiber (FIG. 7). This arrangement of preforms allows the manufacture of aircraft load frames 2 with the parts for joining them to the following frame integrated therewith, as can be seen in FIG. 8. The preforms are made of fabric and reinforcements with unidirectional tape in the inner flanges to increase their moment of inertia and, consequently, their rigidity.

Likewise, the jig object of the invention comprises the following elements: an injection and curing jig 7, a vacuum system 8 and a closing and heating system.

Injection and Curing Jig 7

The injection and curing jig comprises different members:

A tub 10. This is the base element, inside of which the remaining elements shaping the jig 7 as well as the preforms 3, 4, 5 and 6 to be simultaneously injected and cured are placed. This element integrates the resin injection and extraction boreholes, the resin distribution channel, the sealing system for the subsequent application of a vacuum and the thermocouples for thermal control of the jig 7 during heating cycle.

An assembly of male parts 11. This is the assembly of machined male parts that goes under the C-shaped preform 3. They allow demolding the frame 2 without difficulties. These male parts are longitudinally cut to make demolding and handling easier.

An assembly of male parts 12. This is the assembly of upper male parts shaping the frame 2 on the side of the outer flange, i.e. the one in contact with the fuselage skin and the legs of the stringers. It copies the entire geometry of the skin on which it rests, as well as the shape of the legs of the stringers, while at the same time it incorporates grooves on its upper surface for the injection of resin. These grooves open into the inlet and outlet boreholes of tub 10. The male parts 12 are longitudinally cut to make demolding and handling easier.

An assembly of male parts 13. This is the assembly of upper male parts shaping the frame 2 on the side of the inner flange, i.e., the one in the innermost part of the fuselage and serving to stiffen the section of the mentioned frame 2. The reinforcements with unidirectional tape giving rigidity to the frame 2 are placed on this flange. It incorporates grooves at its inner surface allowing the extraction of the resin. These grooves open into the resin outlet boreholes of the tub 10.

An assembly of male parts 14. They are the male parts in both sides of the stabilization ribs 5 for stabilizing the web of the frame 2, and therefore, such male parts are placed between the male parts 11. They are provided with a resin outlet channel to allow the correct impregnation of the ribs 5. Their design must be such that it allows demolding.

Cover 15. It is the upper part of the jig 7, sealing said jig 7 against the tub 10, to the sealing system incorporating said tub 10. The cover 15 is planar to ensure in a simple and efficient manner the vacuum level required inside the jig 7. It incorporates thermocouples for the thermal control of the jig 7 during the heating cycle thereof.

Vacuum System 8

The vacuum system 8 comprises the following elements:

An assembly of sealing rubbers 16, arranged in several grooves at the upper part of the tub 10.

A system of hollow silicone tubes 20, 22 joining the jig 7 with the vacuum pump 17 and the resin injection machine 19.

A vacuum circuit 21. A leak-tight (metallic or non-metallic) tube circuit 23 to which the silicone tubes coming from the injection and curing jig 7 are led, and from which comes another silicone 22 tube leading to the vacuum pump 17. It is therefore a circuit arranged over the press 18 and joining the different resin extraction points of the jig 7 to one other. The connection between the vacuum circuit 21 and the silicone tubes 20 leading to the jig 7 is made through leak-tight connectors. To prevent the resin inform entering the vacuum system 21, the joining is done through expansion or draining vessels, and the resin would fall on such vessels if it accidentally reached this position.

Vacuum pump 17. It is able to reach a vacuum level of 0.5 mbar.

Closing and Heating System

According to the concept of the injection and curing jig 7 detailed in this invention, two processes for closing and heating the jig 7 can be used for the resin injection and curing process:

A hot plate press 18. It consists of hydraulic or pneumatic presses, with the geometry enveloping all of those frames 2 which are to be manufactured, with the following basic operating concept.
  i. Pushing cylinders at the upper part of the press, reacting against columns connected to the floor.
  ii. A lower carriage with horizontal movement, for inserting and extracting tools in the press.
  iii. Upper heated plate.
  iv. Lower heated plate.
  v. Pressure and temperature control system with a programmable automaton.
  vi. Insulating hood to prevent heat escape during the heating cycle.
  vii. A bushing system to pass the resin injection and extraction tubes from the injection system to the jig 7.
  viii. A connection system for the thermocouples housed in the jig 7, such that the programmable automaton controls the different heating areas of the plates of the press, according to the local temperature of the jig 7.

Injection and curing autoclave. In this case, the autoclave exerts the closing pressure, for which it is necessary to close the jig 7 with a vacuum lock. The resin injection and extraction tubes must be able to withstand the pressure of the autoclave without collapsing, for which the they will be connected to the bushing of the autoclave to connect said autoclave with the resin injection system.

According to a second aspect, the present invention develops a method of manufacturing composite material load frames for aircraft comprising the following steps:
  1. Placing and closing the injection and curing jig 7.
  2. Placing the jig 7 on the injection and curing press 18.
  3. Connecting the vacuum system 8.
  4. Applying pressure to the press 18, to close the jig 7 and to ensure tightness.
  5. Heating the jig 7 up to the injection temperature.
  6. Applying vacuum to the jig 7 though the vacuum system 8.
  7. Injecting the resin.
  8. Restricting the silicone tubes 20 once the resin has overflowed through the injection hoses.
  9. Applying compacting pressure to the injection machine 19, up to 3 bar, i.e. the resin passing through the inlet tube of the jig enters with a pressure of 3 bar.
  10. A heating gradient up to the curing temperature.
  11. Maintaining the curing temperature.
  12. Cooling.
  13. Demolding.

Those modifications which are comprised in the scope of the following claims can be introduced in the described preferred embodiment.

The invention claimed is:

1. A method for assembling a jig and preforms for producing cured preforms of an aircraft fuselage frame, which comprises assembling jig-components and preforms so that said jig components are assembled to contain cavities shaped to hold said preforms and preforms are located in said cavities, said preforms comprising 1) at least one C shaped preform having an inner surface and outer surface, 2) at least one L shaped angular preform having two limbs, said L-shaped preform adjoining the said C shaped preform, 3) at least one stabilization rib for stabilizing the frame and 4) at least one additional preform in a junction between the C shaped preform and the L shaped angular preform, wherein said jig further comprises an injector for injecting resin into said cavities and heater for curing resin in said cavities, a vacuum system allowing shaping of preforms by applying vacuum and heat and a closing system.

2. A method according to claim 1, wherein said at least one additional preform positioned at the junction of the C shaped preform and the L shaped angular preform comprises roving or staple fiber.

3. An method according to claim 1, wherein at least one of said preforms have been manufactured by resin transfer molding technology.

4. A method according to claim 1, wherein said preforms comprise fabric and reinforcements with unidirectional tape in an inner flange of said preforms such that said preforms have moments of inertia and rigidity that is greater than similarly shaped preforms lacking such fabric and reinforcement.

5. A method according to claim 1 wherein the preforms, jig components, injector and heater are located in a tub and wherein said C shaped and L shaped preforms are arranged such that one limb of an L shaped preform abuts the outer surface of a C shaped preform and the preforms are placed such that a first male parts jig structure is located within the space defined by the inner surface of C shaped preform a second male parts jig structure is located adjacent the outer surface of said C-shaped preform and to the first side of the upright of the L shaped preform, a third male parts jig structure is located above said C-shaped preform and to the second side of the upright of the L shaped preform and a further male parts jig structure is arranged on both sides of the stabilization ribs for stabilizing the frame and the assemblies of male parts are sealed within the tub by a cover.

6. A method according to claim 5, wherein the vacuum system comprises (a) an assembly of sealing rubbers arranged at the upper part of the tub containing said injector and heater, (b) a vacuum pump, c) a system of tubes joining the injector with a resin injection machine and with the vacuum pump, and a vacuum circuit closing the tub and from which the tubes joining said tub with the vacuum pump and with the resin injection machine come out.

7. A method according to claim 1, wherein the heating and closing system comprises a hot plate press.

8. A method according to claim 1, characterized in that the heater and closing system comprises an autoclave.

9. A method of manufacturing composite material aircraft fuselage frames comprising the following steps:
 a) assembling a jig assembly, said assembly comprising a jig and preforms of an aircraft fuselage composite material frame wherein said jig contains cavities shaped to hold said preforms and preforms are located in said cavities, said preforms comprising 1) at least one C shaped preform having an inner surface and outer surface, 2) at least one L shaped angular preform having two limbs adjoining the said C shaped preform, 3) at least one stabilization rib for stabilizing the frame and 4) at least one additional preform in a junction between the C shaped preform and the L shaped angular preform;
 b) Placing the jig assembly in a heating and closing system;
 c) Connecting a vacuum system to said system;
 d) Applying pressure on the closing and heating system to close the jig assembly and ensure tightness;
 e) Heating the jig assembly to the injection temperature;
 f) Applying vacuum to the jig assembly through the vacuum system;
 g) Injecting resin;
 h) Applying compacting pressure to the assembly;
 i) Heating the preforms to curing temperature;
 j) Maintaining curing temperature;
 k) Cooling; and
 l) Demolding the assembly.

10. A method according to claim 9, wherein said at least one additional preform positioned at the junction of C shaped preform and the L shaped angular preform comprises roving or staple fiber.

11. An method according to claim 9, wherein at least one of said preforms have been manufactured by resin transfer molding technology.

12. A method according to claim 9, wherein said preforms comprise fabric and reinforcements with unidirectional tape in an inner flange of said preforms such that said preforms have moments of inertia and rigidity that is greater than similarly shaped preforms lacking such fabric and reinforcement.

13. A method according to claim 9 wherein the preforms, jig components, injector and heater are located in a tub and wherein said C shaped and L shaped preforms are arranged such that one limb of an L shaped preform abuts the outer surface of a C shaped preform and the preforms are placed such that a first male parts jig structure is located within the space defined by the inner surface of C shaped preform a second male parts jig structure is located adjacent the outer surface of said C-shaped preform and to the first side of the upright of the L shaped preform, a third male parts jig structure is located above said C-shaped preform and to the second side of the upright of the L shaped preform and a further male parts jig structure is arranged on both sides of the stabilization ribs for stabilizing the frame and the assemblies of male parts are sealed within the tub by a cover.

14. A method according to claim 13, wherein the vacuum system comprises (a) an assembly of sealing rubbers arranged at the upper part of the tub containing said injector and heater, (b) a vacuum pump, c) a system of tubes joining the injector with a resin injection machine and with the vacuum pump, and a vacuum circuit closing the tub and from which the tubes joining said tub with the vacuum pump and with the resin injection machine come out.

15. A method according to claim 9, wherein the heating and closing system comprises a hot plate press.

16. A method according to claim 9, characterized in that the heater and closing system comprises an autoclave.

17. A method according to claim 1 wherein the cured preforms that are to be produced are aircraft fuselage load frames and said C-shaped preform and said L-shaped preform are arranged in said assembly of jig components and preforms such that the upright portion of the L-shaped preform extends away from a position on the outer surface of the C-shaped preform at a location intermediate the ends of the C-shaped preform.

18. A method according to claim 17 wherein at least one additional preform in a junction between the C shaped preform and the L shaped angular preform is located at about the mid point of the outer surface of the C-shaped member.

19. A method according to claim 9 wherein the cured preforms that are to be produced are aircraft fuselage load frames and said C-shaped preform and said L-shaped preform are arranged in said assembly of jig components and preforms such that the upright portion of the L-shaped preform extends away from a position on the outer surface of the C-shaped preform at a location intermediate the ends of the C-shaped preform.

20. A method according to claim 19 wherein at least one additional preform in a junction between the C shaped preform and the L shaped angular preform is located at about the mid point of the outer surface of the C-shaped member.

* * * * *